3,350,564
VOID DETECTION UTILIZING NEUTRON ATTENUATION
Charles F. Bonilla, Tenafly, N.J., and William T. Sha, Pittsburgh, Pa., assignors to the United States of America as represented by the United States Atomic Energy Commission
No Drawing. Filed Dec. 23, 1964, Ser. No. 420,839
2 Claims. (Cl. 250—106)

ABSTRACT OF THE DISCLOSURE

A method of measuring the void fraction of boiling water using neutron attenuation. Small amounts of boron are dissolved in the water to absorb the neutrons and a beam of low energy neutrons is made to pass through the boiling water. The amount of attenuation is related to the void fraction of the water.

The invention described herein was made in the course of, or under a contract with the U.S. Atomic Energy Commission.

---

The present invention relates to void detection and more particularly to the detection of the steam or void fraction in a body of boiling water or other liquid containing substantial fractions of light hydrogen.

Precise knowledge of axial distribution of voids in a water moderated nuclear fission reactor is important to its design in order to calculate acceleration and friction pressure drops in the local and bulk boiling modes, predict burnup and core lifetime, predict departure from nucleate boiling heat flux and flow instability, and other reactor characteristics.

The formation of a steam void along a fuel channel in a reactor is an exceedingly complex phenomenon which defies accurate prediction based upon present analytical techniques. Only suitable experimental evidence is capable of producing the necessary information to predict the formation of voids in a water moderated reactor.

There are many techniques which have been developed to produce this empirical information. Radioactive tracer dissolved in the liquid is a sensitive technique producing results independent of flow patterns, but shielding problems, high background radiation and other difficulties have curtailed its application. Photographing the liquid undergoing vaporization is a simple and informative method quite frequently used, but the accuracy is questioned because of uncertainties involved in counting and measuring the bubbles and difficulties in interpreting two-dimensional photographs of three-dimensional phenomena.

Attenuating techniques have been developed involving the application of gamma rays, X-rays, beta-particles, and neutron beams but each has some drawback, especially when used with water, which limits its usefulness. The attenuation coefficient of gamma rays and X-rays that can penetrate steel walls is so low in water that accuracy is poor. Beta-particles have only a short range which limits even more the possible size of the test section and thickness of metal walls.

Neutron attenuation has shown the greatest promise but previous techniques relying on this form of energy were only useful within a nuclear reactor itself, where it is possible to obtain ratios of thermal and epithermal neutron flux distribution as a function of local hydrogen density. This limits the type of information obtainable and the nature of the experiments which can be conducted as well as the size and shape of the test section upon which the data can be collected. The use of thermal neutron flux attenuated in out-of-pile test sections is a possibility but no convenient sources of this type of flux are generally available, which would seem to limit its possible application for most researchers in this area.

The present invention makes it possible for the first time to utilize neutron fluxes, which are readily obtainable today from compact radioactive sources external to a nuclear reactor, as a tool for measuring the void fraction of a liquid, especially water, with great sensitivity and accuracy over a wide range of conditions including the size and shape of test sections. Briefly described, this invention is based upon the use of a neutron source implanted within a test section to emit neutrons of low energy and thus having a short slowing-down length. The water in the test section is treated to a small amount of a material with a large thermal neutron absorption cross-section, which greatly increases the thermal neutron attenuation coefficient of the water. The thermal neutron flux can be shown, both experimentally and theoretically, to be a function of the density or void content of the water and is measured against the outside of the test section. This technique involves both moderation of fast neutrons and absorption of thermalized neutrons.

It is thus a first object of this invention to provide a method of measuring the void fraction in a liquid, particularly a hydrogenous liquid.

It is a further object of the invention to provide a method of determining the void fraction in water.

Still another object of the invention is the measurement of void fraction distribution in a liquid undergoing vaporization.

Additional objects and advantages of this invention will become more readily apparent from the following description of a preferred embodiment of this invention.

In accordance with this invention a source is utilized in a sealed unit or chamber or vessel in which it is desired to measure the void fraction of liquid such as water under a variety of flow, pressure, temperature and other conditions. Immersed within the vessel is a source of neutrons of low energy, having a short slowing-down length. In addition, to increase greatly the thermal neutron attenuation coefficient to permit the measurement of void fractions down to 3% and below, a material such as boron with a large neutron absorption cross-section is dissolved in the liquid flowing through or contained within the vessel. The thermal neutron flux, which is a function of the density or void content of the liquid, is then measured outside of the chamber by suitable neutron detection apparatus. This method is herein referred to as neutron beam attenuation.

In carrying out this invention it is necessary to provide a source of neutrons having low energy for reasons which will become obvious later. For this purpose, an Sb-Be neutron source has been found to be suitable. Be is a convenient neutron source when placed in an alpha or gamma radiation field. The energy of the neutron given off is the excess from that of the colliding particle down to the threshold energy. As radioactive alpha radiation always has a range of energies, so would the neutrons produced always have when Be is placed in an alpha radiation field. Since gamma radiation is in monochromatic bands, the use of a gamma source with the Be will result in neutrons of uniform energy. The threshold energy for gammas to produce neutrons with Be is high (1.62 mev.), so that the common gamma sources (e.g., Co–60 and Cs–137) are inadequate. Other long-lived gamma ray sources were investigated but were found to be unsuitable for a variety of reasons. The isotope Sb–124, which is made from natural Sb by neutron-irradiation in a reactor, produces gamma irradiation of slightly higher energy than the threshold, so the neutrons produced would be low (0.03 mev.) as well as uniform in energy, and in addition Sb–124 has an adequate half-life of 60 days. The Sb-Be source actually used for the tests described below consisted of a hollow Be cylinder 1 1/16" O.D. x 3/8" I.D. x 1 1/2" long and a 0.312" O.D. x 1 3/4" long Sb capsule. The Sb capsule had an initial gamma strength of approximately 0.35 curie. The neutron yield was approximately 90,000 neutrons per second when the Sb capsule was in place in the Be cylinder.

The neutron detection apparatus used in tests of this invention consisted of a $BF_3$ counter, a pre-amplifier and a scaler of conventional design, such as the RIDL Model 49-50 scaler. The $BF_3$ counter is held horizontal with its axis aimed radially at the Sb-Be source. A cadmium sheet covers the counter except for the end facing the neutron source, to limit the capture of stray neutron radiation. In the tests, the water contained in solution up to 2000 p.p.m. of boron (0.2% by weight). Boron was selected for the purpose herein described because it was not desired in large concentrations so that it would not affect boiling of the solution. Further, it is the only element having the desirable thermal neutron absorption cross-section which is normally in anions and thus likely to stay in solution, and at the same time it is cheap and readily available.

Several series of experiments were conducted to test the effectiveness of the inventive concept. In a first series of experiments demonstrating the usefulness of this invention, a pair of concentric tubes were mounted with the axes vertically situated and the Sb-Be neutron source tube was placed within the inner tube. The annular space between the two outer concentric tubes was then filled with water leaving an air space between the neutron source tube and the inner tube. In this series of tests in which there was a total void adjacent to the neutron source tube, the void fraction was varied by changing the sizes of the two outer concentric tubes.

In a second series of experiments utilizing the same apparatus as in the first series, water filled the space between the inner concentric tube and the source tube, and the annular space between the first and second tubes was empty, placing the total voids outside of the water.

In the third and final series of tests, a homogeneous void was approximated by bubbling air through the test section, employing only the source tube and one outer tube. A bubbling ring was located on the bottom of the test section and the source was high enough so that its height did not appreciably affect the counting rate. The average void fraction was given by the rise in depth of the water due to the air bubbles divided by the final depth. The void fraction was readily varied by adjusting the air flow rate. It was assumed that although the local void fraction at the height of the source might be slightly different than the observed overall average void fraction, it is close to the average void fraction and thus gives an accurate indication as the sensitivity of the method to void fraction.

The results of the foregoing tests produced the following conclusions pertinent to this invention:

(1) The neutron beam attenuation technique comprising this invention exhibits very high response. It is readily capable of detecting void fractions of 3% or less in an out-of-pile test section. As previously mentioned, there has been no reliable void detection technique capable of such sensitivity in a test section simulating an actual fuel rod channel.

(2) The response of an over-moderated test section (one in which the ratio of thermal neutron flux at the outermost edge of the test section with voids to the thermal neutron flux at the same location without voids is greater than unity) is increased by increasing the neutron exposure to the boron in solution (i.e., increasing the test section size or the boron concentration).

A study was previously conducted to investigate the effects due to boron on the departure from nuclear boiling (DNB) heat flux and heat transfer characteristics of water. Data showed no detectable effect on adding boron in useful concentrations up to 2000 p.p.m. Therefore, it is reasonable to assume that void formation along the channel is not affected by the presence of boron in the coolant so long as the range of boron concentration is limited to approximately 2000 p.p.m.

It is thus seen that there has been provided a unique method for the determination of the void fraction within a closed vessel or chamber of liquid such as water with a range of operation and a degree of accuracy heretofore unobtainable. While only a preferred embodiment of this invention has been described it is understood that the scope of this invention is not to be limited thereby but is to be determined by the appended claims.

We claim:
1. A method of measuring the void fraction of boiling water comprising the steps of:
 (a) dissolving a small amount of boron in said water in the range of 0-2000 p.p.m.;
 (b) implanting in said water a neutron beam encapsulated isotopic source of low uniform energy;
 (c) measuring the intensity of said beam of neutrons after passing through a given section of said water to produce a value which is a function of the void fraction of said water.
2. The method of claim 1 in which the source consists of Sb-Be.

References Cited
UNITED STATES PATENTS

| | | | |
|---|---|---|---|
| 2,947,869 | 8/1960 | Egan et al. | 250—43.5 |
| 3,100,840 | 8/1963 | Morganstern | 250—106 |
| 3,164,722 | 1/1965 | Biehl et al. | 250—84.5 |
| 3,165,446 | 1/1965 | Untermyer | 250—83.1 X |

RALPH G. NILSON, *Primary Examiner.*

A. B. CROFT, *Assistant Examiner.*